(12) United States Patent
Schubert et al.

(10) Patent No.: US 8,155,821 B2
(45) Date of Patent: Apr. 10, 2012

(54) VACUUM BRAKE BOOSTER AND METHOD FOR THE OPERATION THEREOF

(75) Inventors: Peter Schubert, Wiesbaden (DE);
Patrick Merzoug, Hattersheim (DE);
Nathan Zambou, Wiesbaden (DE);
Guntjof Magel, Rüsselsheim (DE);
Ralph Gronau, Wetter (DE)

(73) Assignee: Continental Teves AG & Co. oHG (DE)

( * ) Notice: Subject to any disclaimer, the term of this patent is extended or adjusted under 35 U.S.C. 154(b) by 829 days.

(21) Appl. No.: 12/161,213

(22) PCT Filed: Jan. 19, 2007

(86) PCT No.: PCT/EP2007/050535
§ 371 (c)(1),
(2), (4) Date: Jul. 17, 2008

(87) PCT Pub. No.: WO2007/082932
PCT Pub. Date: Jul. 26, 2007

(65) Prior Publication Data
US 2010/0168978 A1 Jul. 1, 2010

(30) Foreign Application Priority Data

Jan. 20, 2006 (DE) .......................... 10 2006 003 059
Jan. 19, 2007 (DE) .......................... 10 2007 003 741

(51) Int. Cl.
*B60T 17/22* (2006.01)
(52) U.S. Cl. .................. 701/30.3; 701/30.2; 701/70
(58) Field of Classification Search .................. 701/30.2, 701/30.3, 70
See application file for complete search history.

(56) References Cited

U.S. PATENT DOCUMENTS
4,633,757 A * 1/1987 Kubota ...................... 303/114.3
(Continued)

FOREIGN PATENT DOCUMENTS
DE 100 52 257 A1 5/2002
(Continued)

OTHER PUBLICATIONS

"Plausibilize, v.". OED Online. Mar. 2011. Oxford University Press. http://oed.com/view/Entry/145465?rskey=Y801IH&result=7 &isAdvanced=false (accessed May 5, 2011).*

*Primary Examiner* — Mark Hellner
*Assistant Examiner* — Ari M Diacou
(74) *Attorney, Agent, or Firm* — RatnerPrestia

(57) ABSTRACT

A vacuum brake booster and a method of operation of a vacuum brake booster of a vehicle brake system is disclosed. The vacuum brake booster includes a housing subdivided into at least one vacuum chamber and at least one working chamber. The vacuum chamber is connected to a vacuum source by way of a vacuum port. A sensor unit is associated with the vacuum chamber and is configured for sensing a pressure in the vacuum chamber and supplying a sensed pressure value to an electronic control unit (ECU). The ECU includes an evaluating unit for evaluating the sensed pressure value and calculating the operating point of the vacuum brake booster solely on the basis of the sensed pressure in the vacuum chamber. Plausibilization of the sensed pressure value is performed to monitor the overall system and identify defects of the sensor unit or the vacuum brake booster.

6 Claims, 7 Drawing Sheets

U.S. PATENT DOCUMENTS

| | | | |
|---|---|---|---|
| 4,637,661 A * | 1/1987 | Kohno | 303/24.1 |
| 4,660,386 A * | 4/1987 | Hansen et al. | 62/126 |
| 4,930,607 A * | 6/1990 | Shimamura et al. | 477/196 |
| 5,694,808 A * | 12/1997 | Weis | 73/168 |
| 6,033,038 A * | 3/2000 | Kulkarni et al. | 303/114.3 |
| 6,185,498 B1 * | 2/2001 | Linden et al. | 701/70 |
| 6,741,918 B2 * | 5/2004 | Kerns et al. | 701/34 |
| 6,871,918 B2 * | 3/2005 | Wild et al. | 303/122.09 |
| 7,267,412 B2 * | 9/2007 | Gronau et al. | 303/114.3 |
| 8,033,618 B2 * | 10/2011 | Tuhro et al. | 303/113.3 |
| 2004/0243290 A1 * | 12/2004 | Schmidt et al. | 701/34 |
| 2005/0218716 A1 * | 10/2005 | Collins et al. | 303/115.3 |
| 2010/0036576 A1 * | 2/2010 | Diekmeyer et al. | 701/70 |

FOREIGN PATENT DOCUMENTS

| | | |
|---|---|---|
| DE | 102 18 972 A1 | 2/2003 |
| DE | 102 24 590 A1 | 2/2003 |
| EP | 0 850 815 A1 | 7/1998 |
| FR | 2 618 744 A1 | 2/1989 |
| WO | WO 02/34601 A1 | 5/2002 |
| WO | WO 03/024760 A2 | 3/2003 |
| WO | WO 2006/092348 A1 | 9/2006 |

* cited by examiner

VACUUM BRAKE BOOSTER AND METHOD FOR THE OPERATION THEREOF

This application is the U.S. national phase application of PCT International Application No. PCT/EP2007/050535, filed Jan. 19, 2007, which claims priority to German Patent Application No. 10 2006 003 059.1, filed Jan. 20, 2006, and German Patent Application No. 10 2007 003 741.6, filed Jan. 19, 2007, the contents of such applications being incorporated by reference herein in their entirety.

BACKGROUND OF THE INVENTION

1. Field of the Invention

One aspect of the present invention relates to a vacuum brake booster and a method of operation of a vacuum brake booster of a vehicle brake system.

2. Description of the Related Art

Vacuum brake boosters are employed in order to boost the brake force exerted by the driver at the brake pedal. The vacuum brake booster consists of at least two chambers exhibiting a difference in pressure. These chambers are the working chamber and the vacuum chamber, which are integrated into the brake system in such a fashion that the working chamber is connected to the atmosphere. The vacuum chamber is bled by means of a vacuum supply. Both chambers are separated by a diaphragm. The vacuum furnished by the internal combustion engine or a vacuum pump boosts the pedal force that is to be applied by the driver. Depending on the available vacuum, a condition is reached with defined pedal forces, which renders further increase of the force on the actuating unit possible only by an increase in the pedal force since the vacuum brake booster has reached the maximum possible boosting force. This condition is referred to as the operating point of the vacuum brake booster.

WO 2006/092348 A1 discloses a method for detecting the control point of a vacuum booster. In the prior art method, the pressure prevailing in the vacuum chamber is measured by means of a pressure sensor, and the control point is calculated with the aid of a mathematical function solely on the basis of the pressure prevailing in the vacuum chamber. It is intended according to the prior art method that the control point is detected when the pressure signal of the pressure sensor exhibits a minimum. The question whether the signal of the single pressure sensor is secured or reliable is not dealt with.

In view of the above, one aspect of the invention involves improving the method described hereinabove in such a manner that operation of a vacuum brake booster with only one pressure sensor is reliable and safe.

SUMMARY OF THE INVENTION

This object is achieved according to operation of a vacuum brake booster as described herein. It is arranged for that a plausibilisation of the pressure value measured by a sensor unit is performed and possible defects of the sensor unit or the vacuum brake booster are found out.

Thus, it is provided in a favorable improvement that a model is calculated for plausibilisation which estimates the state variables in the vacuum chamber and the working chamber on the basis of empirically determined data in connection with fluidic and thermodynamic processes.

In another favorable improvement, the geometric dimensions of the vacuum chamber and the working chamber as well as ambience conditions of the vacuum brake booster are taken into consideration in the calculation of a model.

The ambience conditions of the vacuum booster reflect the atmospheric pressure, the pressure value of the vacuum source, the hydraulic pressure of a subsequent master brake cylinder and the ambient temperature.

An especially favorable improvement provides that both static and dynamic operating states of the vacuum brake booster are taken into account in the calculation of a model.

Furthermore, the electronic control unit includes an actuating unit which drives an active hydraulic brake force boosting unit on the basis of the evaluation of the pressure values in the vacuum chamber.

An object at topic is also achieved by a device in which a means is provided which performs a plausibilisation of the pressure value measured by the sensor unit and finds out possible defects of the sensor unit or the vacuum brake booster.

In a favorable embodiment, the means comprises a model which estimates the state variables in the vacuum chamber and the working chamber on the basis of empirically determined data in connection with fluidic and thermodynamic processes.

These and other aspects of the invention are illustrated in detail by way of the embodiments and are described with respect to the embodiments in the following, making reference to the Figures.

BRIEF DESCRIPTION OF THE DRAWINGS

In the drawings:

FIG. 6a,b is a time flow chart with parameter variation corresponding to the representation in FIG. 3a.

DETAILED DESCRIPTION OF THE PREFERRED EMBODIMENTS

Figure 1:
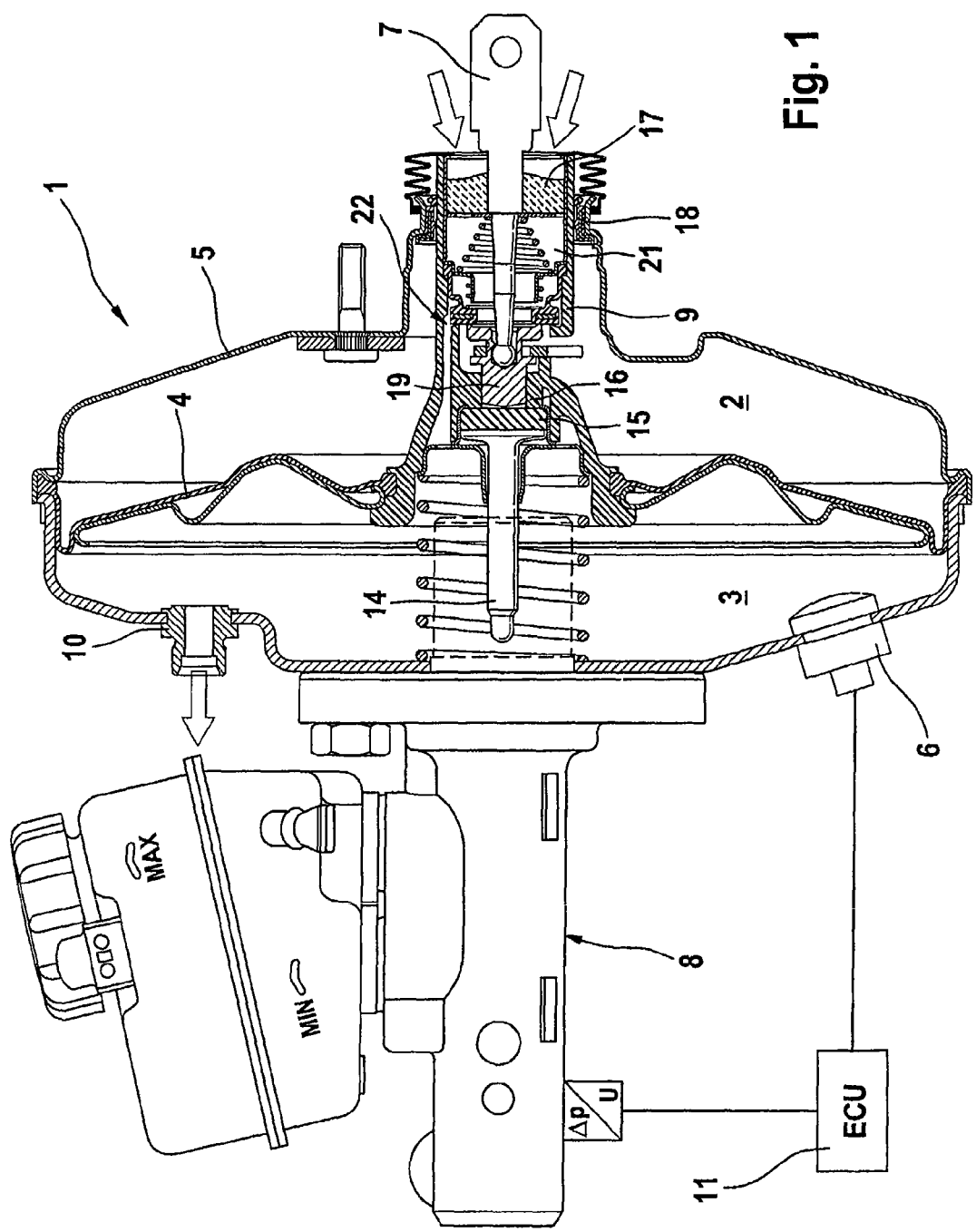
FIG. 1 is a cross-sectional view of a vacuum brake booster.

In FIG. 1 a vacuum brake booster 1 is illustrated which is also referred to as 'booster'. The vacuum brake booster 1 includes a housing 5 which is subdivided into a working chamber 2 and a vacuum chamber 3. This is done by a movable partition 4 which is provided with an axially movable rubber diaphragm. Arranged centrically in the vacuum brake booster 1 is a control hub 9 whose function will be explained in detail in the following. The force output is executed by way of a force output member 14 which is supported on a step 16 through a reaction disc 15. On the other side, the control hub 9 extends through the housing 5 and is axially opened towards the atmosphere by way of a filter 17. The working chamber 2 is sealed relative to the ambience by means of a seal 18 inserted in form-locking fashion.

The force transmission to the reaction disc 15 takes place via a valve piston 19, which is clamped onto a spherical head of a piston rod 7. Piston rod 7 extends through an air space 21 and is in connection with an actuating pedal (not shown). A poppet valve 22 penetrated by piston rod 7 is inserted into air space 21.

The poppet valve 22 is arranged in such a fashion that it separates the air space 21 towards the booster's interior as is the case in the inactive position of the vacuum brake booster 1 illustrated in FIG. 1. The air supply to the working chamber 2 is shut off in this inactive position. Thus, vacuum prevails in the working chamber 2 since the working chamber 2 connects through openings to the vacuum chamber 3 and since the vacuum chamber 3 connects through a vacuum port 10 to a continuously operating low-pressure source or vacuum source (not shown). This position corresponds to an inactive position or release position of the vacuum brake booster.

As has been shown in FIG. 1, the pressure in the vacuum chamber 3 is measured by means of a sensor unit 6. To this end, the sensor unit 6 is in connection to vacuum chamber 3 through an opening.

When a brake pedal connected to the piston rod 7 is actuated and, thus, the piston rod 7 and the valve piston 19 are displaced, the poppet valve 22 is activated and the vacuum chamber 3 and the working chamber 2 are no longer in connection. In the further course of the movement, a connection between the working chamber 2 and the outside air is opened by the poppet valve 22. The input force at the brake pedal is boosted due to the difference in pressure prevailing at the movable partition 4, and a master brake cylinder 8 connected downstream of the vacuum brake booster 1 is actuated by means of the force output member 14. In this ready position, each insignificant change in the pedal force will bring about an increase or decrease of the difference in pressure on both sides of the partition 4, producing via the master brake cylinder 8 an increase or reduction of the hydraulic pressure in the brake system and, thus, controlled deceleration of the motor vehicle.

The maximum possible boosting force of the vacuum brake booster 1 is given when the working chamber 2 is fully ventilated and atmospheric pressure is prevailing in the working chamber 2. The operating point is in this state. Consequently, the maximum difference in pressure between the working chamber and the vacuum chamber 3 is reached in the operating point. Further increase of the force on the master brake cylinder piston which succeeds the force output member 14 is only possible by a still higher pedal force applied by the driver. The hydraulic pressure in the brake system will only increase in a non-boosted manner upon further increase of the pedal force. The result is that after the operating point has been exceeded, further increase of the brake force necessitates a considerably higher force effort at the brake pedal.

To overcome this problem, it is known to switch over to hydraulic boosting when the operating point is reached and to drive a hydraulic pump which develops additional brake pressure. It is, however, necessary for this additional brake force boosting to precisely detect the operating point in order to connect the additional hydraulic boosting in conformity with requirements. Since the vacuum brake booster 1 includes only one pressure sensor 6 for determining the pressure in the vacuum chamber, the operating point is estimated or calculated, respectively.

It is imperative to reliably detect the operating point even when using merely one pressure sensor 6. In particular, defects of the pressure sensor must not lead to erroneous detection of the operating point. Therefore, a plausibilisation check of the pressure value measured by the sensor unit 6 is performed in the method at topic and possible defects of the sensor unit 6 or the vacuum brake booster 1 are found out so that sensor errors are identified and failure of the vacuum brake booster 1 is detected.

For this purpose, a method is provided which produces a model of the overall system and estimates the state variables in the chambers 2, 3 of the vacuum brake booster 1 on the basis of empirically determined relationships, of 'adaptive' performance graphs, of fluidic and thermodynamic processes. The characteristic quantities of the vacuum brake booster 1 such as the geometric dimensions, the volumes of the vacuum chamber and working chamber 2, 3 and an indication about ambience conditions such as the temperature of the internal combustion engine of the motor vehicle, the vacuum in the induction tract or in the vacuum port 10, the atmospheric pressure and the pressure in the master brake cylinder 8 are included in the calculation of a model.

The calculation of a model and the estimation of the pressure in both chambers 2, 3 of the vacuum brake booster 1 is not only limited to defined actuating conditions of the brake booster 1, that means application of the brake pedal or no application of the brake pedal, but is provided for all operating conditions of the vacuum brake booster 1.

The essential components of the systems under review are included in the calculation of a model. They are, as illustrated in FIG. 1, the movable partition 1, the working chamber and vacuum chamber 2, 3. In addition, there are the three valves fitted between the side of ventilation, the working chamber 2, the vacuum chamber 3, and the side of venting (induction tract). The sides of ventilation and venting represent the system limits. The connection to the pedal unit through the piston rod 7 is disposed at the side of ventilation. The connections for the master brake cylinder 8, the pressure sensor 6 and the vacuum port 10 can be found at the side of venting.

Figure 2:
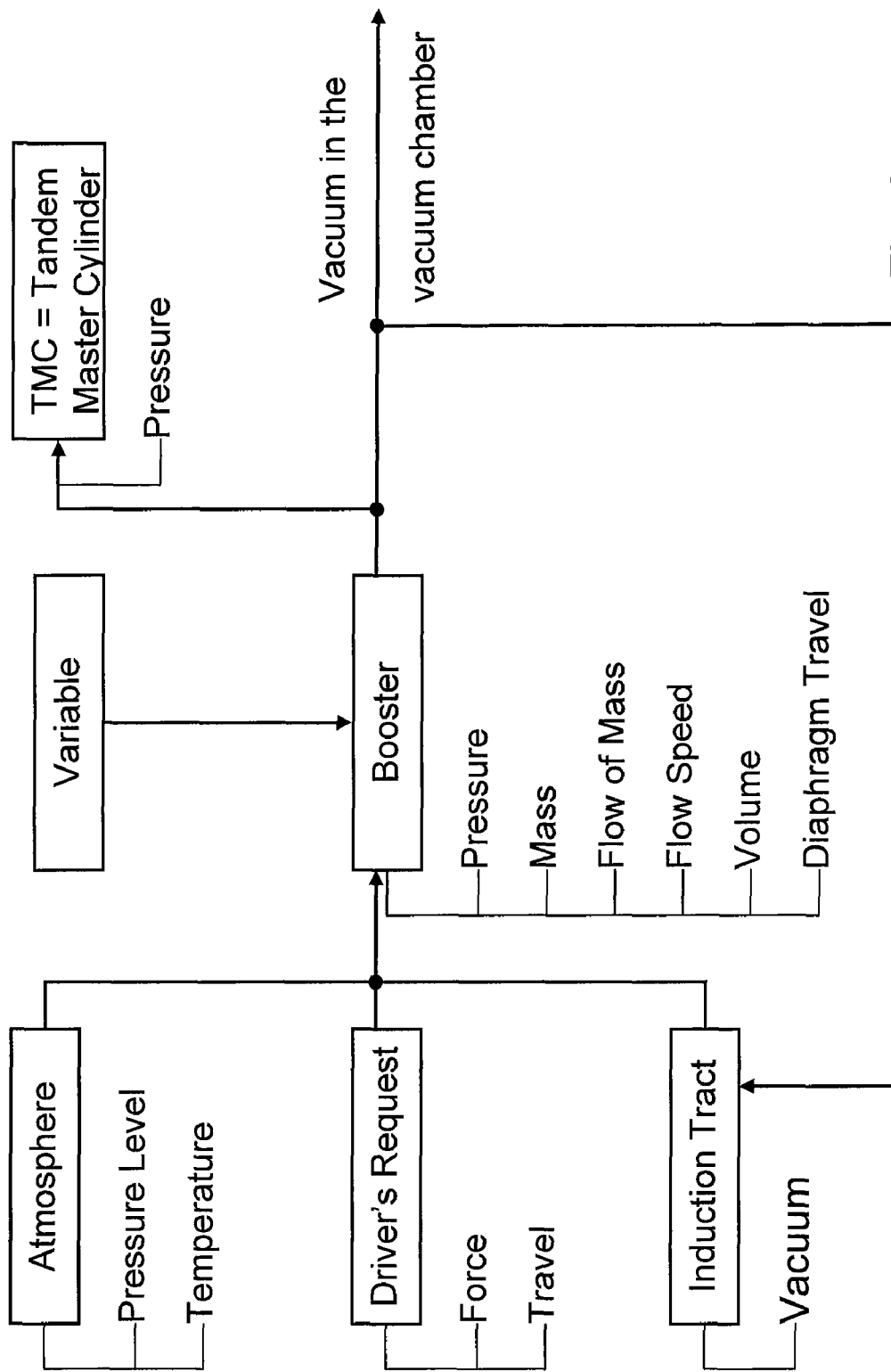
FIG. 2 is an illustration of the structure according to FIG. 1.

The calculation of a model is based on a structural image of the overall system which is illustrated in FIG. 2. Following the principle of brake force boosting, it is obvious to express the driver's request by means of the force exerted by the operator at the pedal or the brake pedal travel. The detected driver's request is an input quantity of the system. Additional input quantities are the vacuum in the induction tract or at the vacuum port 10, the atmospheric pressure or the height above mean sea level and the ambient temperature.

The characteristic quantities of the chambers 2, 3 and the valves are included into the calculation of a model as parameters of the vacuum brake booster 1. The fluidic processes which take place in the vacuum brake booster 1 are sensed by means of the conservation laws of the mass in a chamber 2, 3 and the impulse along a flow line. The latter impulse can be derived from the Bernoulli equation. The state equation of the ideal gas provides the basis for the description of thermodynamic actions. The inclusion of the first and/or second fundamental law of thermodynamics renders it possible to precisely describe the changes in state in the chambers 2, 3 of the brake booster 1. The states of the brake booster 1 considered can be seen in FIG. 2.

The vacuum in the vacuum chamber 3 is chosen as the output quantity. This output quantity is fed back to the system inlet, namely to the induction tract. The condition for this is that a non-return valve is fitted into the induction tract. The hydraulic pressure in the master brake cylinder 8 represents another output quantity.

To support the calculation of a model, a test vehicle is equipped with all sensors required for measuring the input quantities, state quantities and output quantities mentioned in FIG. 2. These sensors are connected to a measuring technique which serves to memorize the values received.

Performance graphs are used for the analysis of the static and dynamic behavior of the overall system in order to reproduce causalities. Furthermore, the acquired model of the overall system is implemented into a simulation tool and is executed. Subsequently, the non-linear model is linearized in order to identify the transmission behavior between the inputs and the outputs of the system.

Since the analysis performed mainly concerns the detection of features or the experimental determination of functional relationships between the states of the overall system which safeguard a fail-safe function of the pressure sensor 6 installed into the vacuum chamber 3, the typical behavior of the vacuum in the vacuum chamber 3 in different operating states is shown in this description. The values of the vacuum in relation to the atmospheric pressure are measured with the aid of the pressure sensor 6 during the driving tests.

Figure 3:
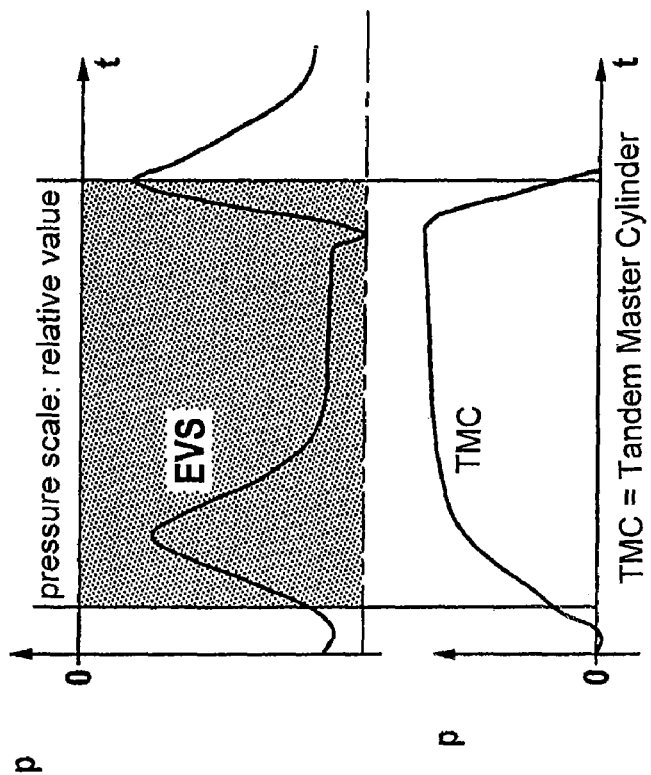
FIG. 3a is a time flow chart of the output signal of a pressure sensor determining the pressure in the vacuum chamber as a function of time.
FIG. 3b is a time flow chart of the pressure sensor signal of FIG. 3a and the output signal of a pressure sensor determining the hydraulic pressure in a tandem master cylinder.

The start point is the bleeding action of the brake booster 1 in the non-actuated state. The buildup of vacuum by a vacuum source can be represented by a delay system of first order, as is illustrated in FIG. 3a. The delay time until the non-return valve opens is ignored in this case. The delay system of first order is described by means of two parameters, i.e. the time constant $T_E$ and the transmission factor $K_E$, which represents the ratio of the output amplitude and the input amplitude in the stationary state.

At the commencement of a brake operation, i.e. at the commencement of actuation of the vacuum brake booster 1, the ventilation can be represented equally by a delay system of first order, as is shown in FIG. 3b. Its parameters are the time constant $T_B$ and the transmission factor $K_B$. The pressure variation in the vacuum chamber 3 is oscillating in the further course of the brake operation and until release of the pedal. These short-term oscillations develop after pedal release partly by an abrupt volume increase of the vacuum chamber 3 which causes an abrupt pressure reduction in the vacuum chamber 3, on the one hand. On the other hand, the poppet valve is simultaneously closed for ventilating the working chamber 2 and the valve between working chamber and vacuum chamber 2, 3 is opened, what results in a new rise of the pressure in the vacuum chamber 3 until a balance between the two chambers 2, 3 is achieved.

Corresponding to the execution of the experimental analysis and the illustration of FIG. 2, several sensors must be employed in the test vehicle which are not provided in all the brake systems or vehicles though.

In spite of very pronounced causality in relation to the behavior of the brake booster 1, the majority of the measurable quantities, due to reduced availability, are not selected as input quantities for the algorithm in order to estimate the states of the brake booster 1. A controlled variable is rather defined in the present method, with which the estimation of the pressure in all chambers 2, 3 of the brake booster 1 is to be mastered.

Figure 4:
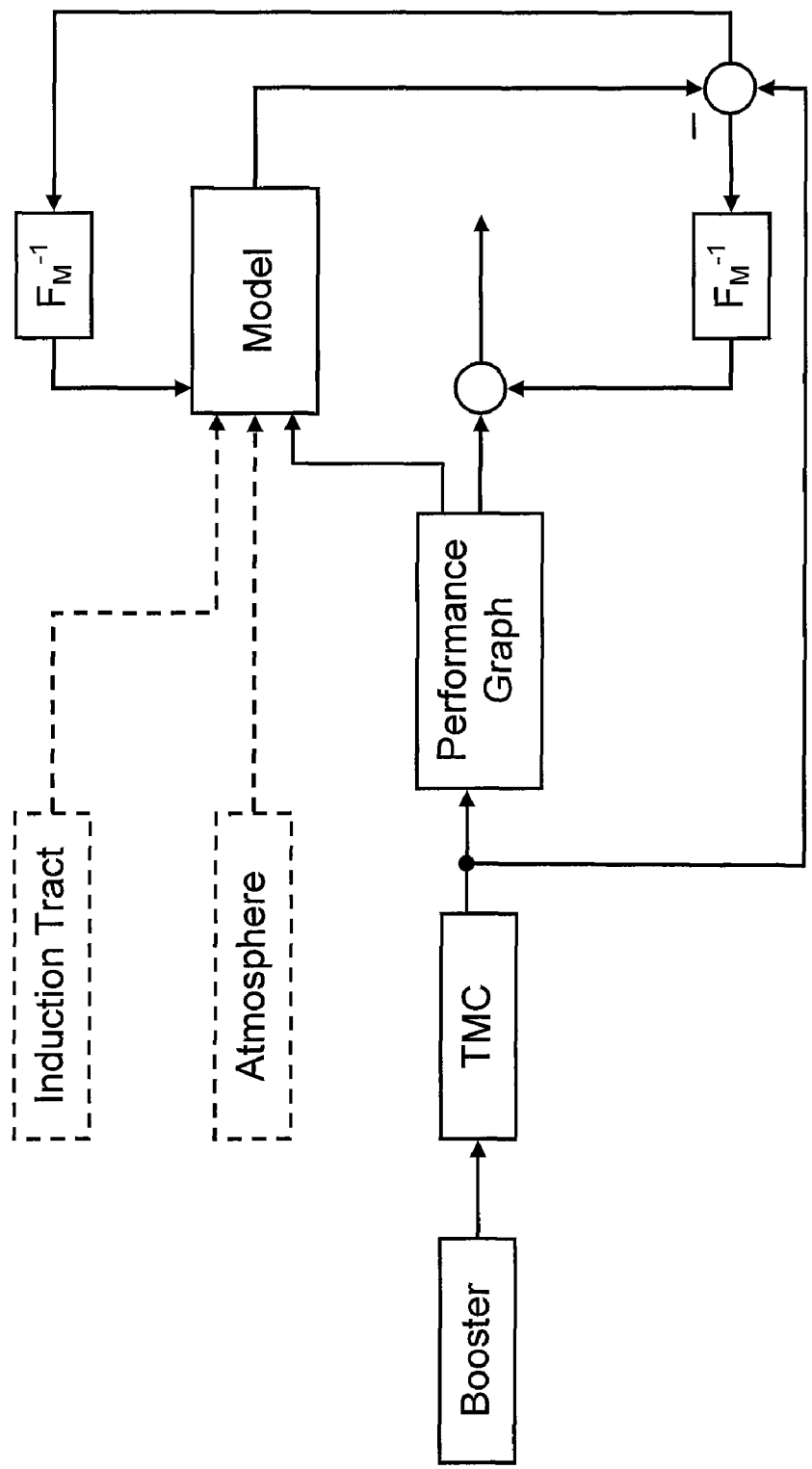
FIG. 4 is a structural representation of an estimation algorithm.

In the method at issue, only one measured quantity is taken into consideration for the layout of a method for estimating state variables of the brake booster 1. This is the hydraulic pressure in the master brake cylinder 8. Depending on the requirement, the input quantities such as the pressure or vacuum in the induction tract, the height above mean sea level or the atmospheric pressure can be included successively in the algorithm. The intention of prescribing the behavior of the brake booster 1 instead of only describing it is decisive for the selection of the pressure of the master brake cylinder 8 as an input quantity in the algorithm for estimation. FIG. 4 shows the structure for putting the resulting estimation algorithm into practice.

The pressure measured in the master brake cylinder mainly serves to determine the driving states 'braking' and 'no braking' and the transitions between these driving states. The beginning and the end of the pedal application, the attaining of the operating point, i.e. the boosting limit of the brake booster 1, and the beginning of pedal release are taken into consideration as transitions. The determination of the states and the mentioned transitions is based on experimentally and empirically determined functionals $F_Z$ between the master brake cylinder pressure and the states and transitions to be determined. The method at issues ensures that the value of the pressure sensor 6 is secured which is required to determine the operating point.

Figure 5:
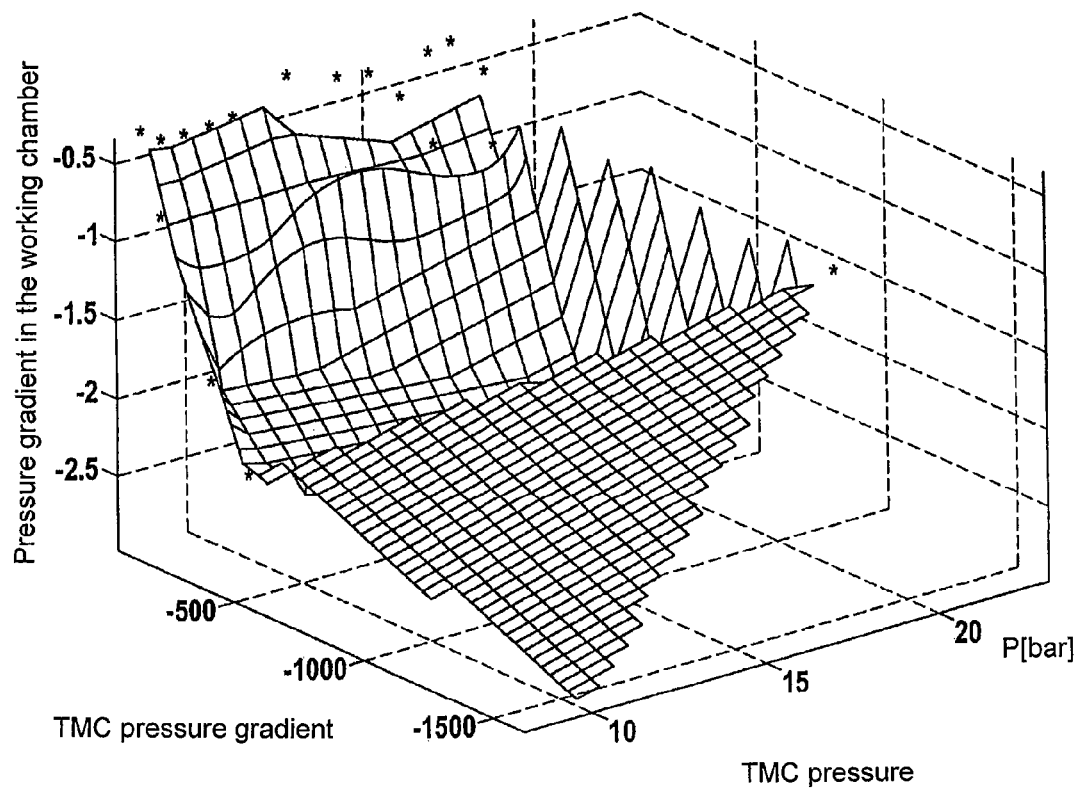
FIG. 5 is an empirically determined performance graph of a vacuum brake booster.

The performance graph mentioned before serves for describing the behavior of state variables in the chambers 2, 3 of the brake booster 1. In the method at issue, a three-dimensional layout of the performance graph is provided which, in addition to an input quantity, comprises its gradient as another input quantity. Furthermore, the characteristics of the valves are also contained in the performance graph. FIG. 5 illustrates as an example a performance graph for establishing the gradient of the vacuum in working chamber 2.

For the unbraked condition, the causal relationship between the pressure in the vacuum supply and the pressure in the vacuum chamber 3 is solely significant. In addition, the pressures in the working chamber and vacuum chamber 2, 3 are identical after the transient effect.

Brake boosters 1 are employed under different atmospheric conditions such as the height above mean sea level. Furthermore, important parameters can change in the course of operation, for example, due to wear processes. In order to counteract these atmospheric differences and variations, a so-called adaptive algorithm is provided in the present method. The adaptation of employed parameters is such that it can also be performed during operation of the vehicle. To this end, data required for the generation of the parameters of the algorithm, or for its adaptation to the changes is collected in a non-volatile memory and adapted during vehicle inspection, for example.

Figure 6A:
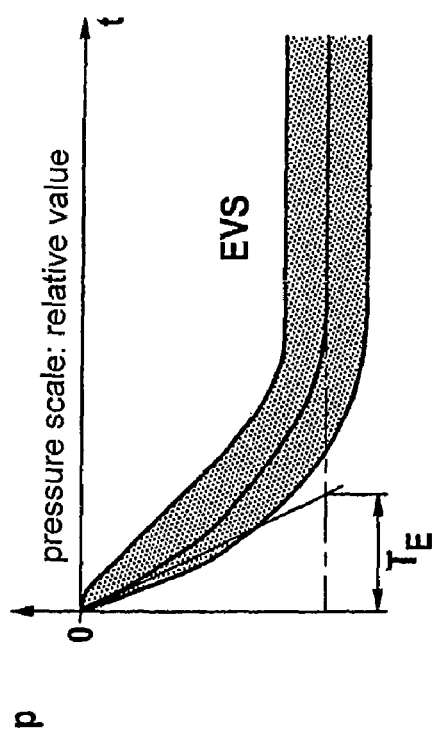
Figure 6B:
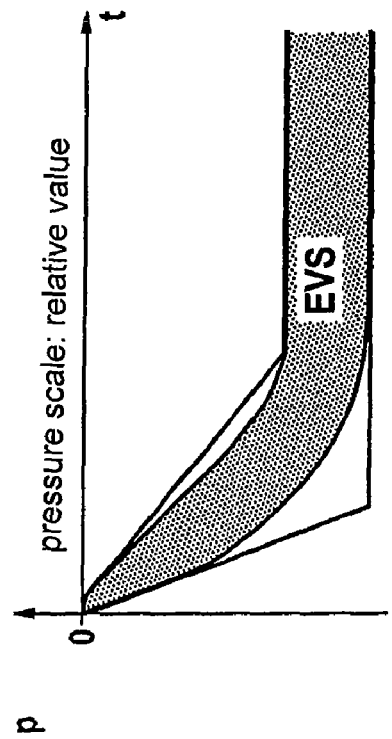

FIG. 6a illustrates a change of the vacuum due to a parameter variation. This shows that the dynamic behavior can change to such extent that it can be described by a delay system or a differential equation of second order, respectively. In the method at issue, the limit of this zone of dispersion is not described by the associated differential equations. Rather, they are estimated by means of algebraic equations as is illustrated in FIG. 6b.

This zone of dispersion is expanded by the tolerance preset by the sensor manufacturer. In addition, the maximum attainable vacuum in the stationary state is limited by the maximum available natural/physical vacuum.

The estimated pressure values in the two chambers 2, 3 of the brake booster 1 are taken into consideration to calculate the estimated difference in pressure between the two chambers 2, 3, on the one hand, and for the plausibilisation of the pressure value output by the single pressure sensor 6, on the other hand.

The pressure value is compared with the comparable estimated pressure value for the plausibilisation of the pressure value output by the pressure sensor 6. Subsequently, fail-free or defective operation of the pressure sensor 6 and/or the brake booster 1 is detected depending on predefined tolerances or threshold values. The tolerance values are composed of individual tolerance values for the estimation, for the pressure sensor 6 and for the detection algorithm.

Figure 7B:
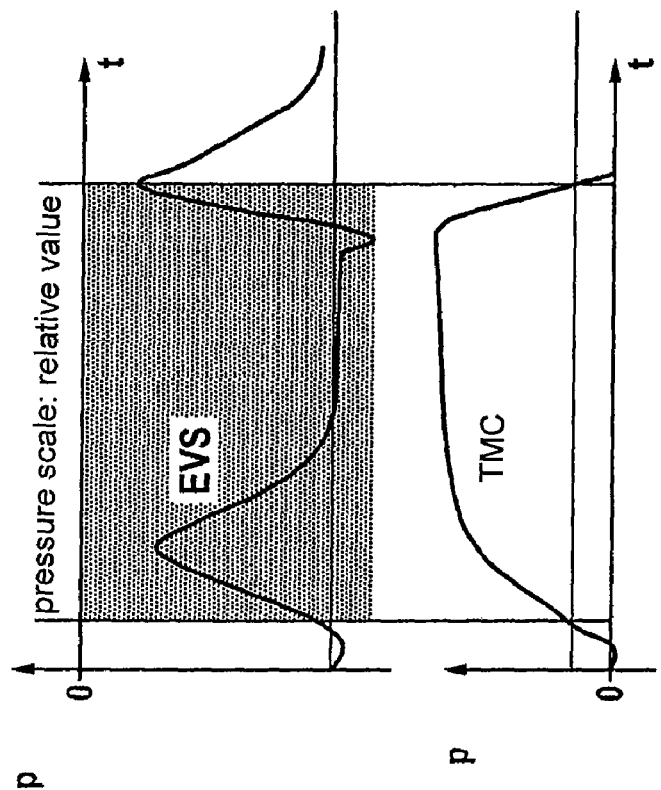
FIG. 7a,b is a time flow chart with parameter variation corresponding to the representation in FIG. 3b.
Figure 7A:
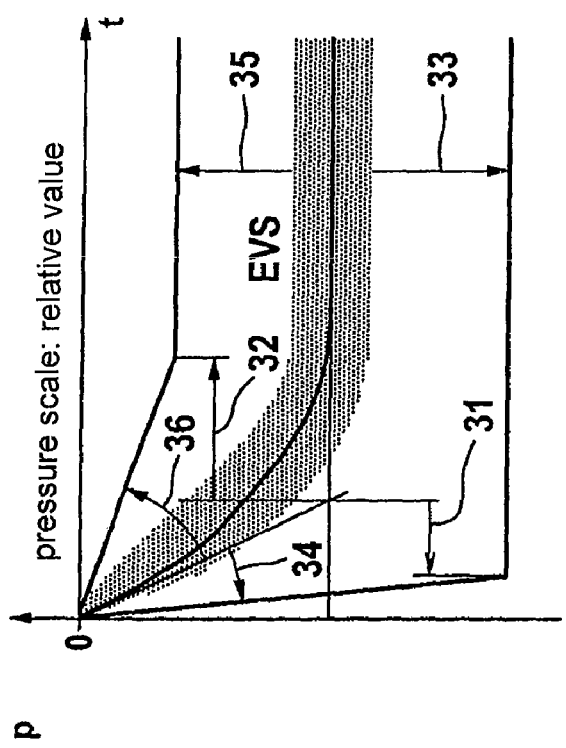

The estimation algorithm is composed of two major parts. The first part is explained in connection with FIG. 7a. The first part covers the operating states after the brake operation. The parameters 31, 32 are implemented together with the estimation algorithm. The remaining parameters 33, 34, 35, 36 are constantly adapted to the preset conditions. The second part of the estimation algorithm is illustrated by way of FIG. 7b: This second part is provided for all states during the brake operation. The vacuum value in the vacuum chamber 2 is rendered more precise by means of the model operating in parallel to the overall system. The resulting amplitudes of the oscillations depending on the pressure introduced by the operator into the master brake cylinder 8 are decisive in the plausibilisation. Fail-free operation in all states is only certified if the pressure value output by the pressure sensor 6 lies within the estimated range of expectation.

To assist the removal of faults in the workshop, the method at issue provides a mode of allocating a fault to the source of faults. This mode is based on the detection of defined sensor defects and/or defects of the brake booster 1 by means of a stored table or matrix, which represents an unambiguously reversible allocation of causes or faults and their effects on the pressure sensor 8 or the estimated pressure values. The table or the matrix is generated by means of tests. Defined cases of faults and measures to reproduce these faults during the tests are defined to this end. Subsequently, tests are carried out in order to link the effects on the pressure sensor 8 and/or on the brake booster 1 to the causes or faults.

It can be seen in the described basis for the development of a method for the estimation of state variables of the brake booster 1 that this basis offers a great potential for a flexible draft of a mode for plausibilisation of the pressure in the chambers 2, 3 of the brake booster 1.

The invention claimed is:

1. A method of operation of a vacuum brake booster of a vehicle brake system, comprising a housing which is subdivided by at least one movable partition into at least one vacuum chamber and at least one working chamber, with the vacuum chamber being connected to a vacuum source by way of a vacuum port, and with a sensor unit associated with the vacuum chamber sensing a pressure in the vacuum chamber and supplying a sensed pressure value to an electronic control unit, the electronic control unit configured to evaluate the sensed pressure value in the vacuum chamber and calculate an operating point of the vacuum brake booster solely on the basis of the sensed pressure within the vacuum chamber, wherein verification of the sensed pressure measured by the sensor unit is performed to identify defects of the sensor unit or the vacuum brake booster, and wherein a model is calculated for the verification which estimates state variables in the vacuum chamber and the working chamber on the basis of empirically determined data in connection with fluidic and thermodynamic processes.

2. Method as claimed in claim 1,
wherein geometric dimensions of the vacuum chamber and the working chamber as well as ambience conditions of the vacuum brake booster are taken into consideration in the calculation of the model.

3. Method as claimed in claim 2,
wherein the ambience conditions of the vacuum booster are represented by the atmospheric pressure, the pressure value of the vacuum source, the hydraulic pressure of a subsequent master brake cylinder and the ambient temperature.

4. Method as claimed in claim 1,
wherein both static and dynamic operating conditions of the vacuum brake booster are taken into account in the calculation of the model.

5. Method as claimed in claim 1,
wherein the electronic control unit includes an actuating unit which drives an active hydraulic brake force boosting unit on the basis of the pressure values in the vacuum chamber.

6. Vacuum brake booster of a vehicle brake system, comprising:
a housing which is subdivided by at least one movable partition into at least one vacuum chamber and at least one working chamber,
the vacuum chamber being connected to a vacuum source by way of a vacuum port,
a sensor unit associated with the vacuum chamber, the sensor unit configured for sensing a pressure in the vacuum chamber and supplying a sensed pressure value to an electronic control unit, the electronic control unit configured to evaluate the sensed pressure value in the vacuum chamber and calculate an operating point of the vacuum brake booster solely on the basis of the sensed pressure in the vacuum chamber, and
wherein the electronic control unit verifies the sensed pressure value measured by the sensor unit and identifies defects of the sensor unit or the vacuum brake booster based on a model which estimates state variables in the vacuum chamber and the working chamber on the basis of empirically determined data in connection with fluidic and thermodynamic processes.

\* \* \* \* \*